United States Patent [19]

Haneishi

[11] 4,408,499
[45] Oct. 11, 1983

[54] CLICK STOP DEVICE

[75] Inventor: Yasuyuki Haneishi, Tokyo, Japan

[73] Assignee: Asahi Kogaku Kogyo Kabushiki Kaisha, Tokyo, Japan

[21] Appl. No.: 269,099

[22] Filed: Jun. 2, 1981

[30] Foreign Application Priority Data

Jun. 5, 1980 [JP] Japan .................................. 55/78502

[51] Int. Cl.³ .............................................. G05G 5/06
[52] U.S. Cl. ..................................................... 74/527
[58] Field of Search ......................... 74/527, 475, 495

[56] References Cited

U.S. PATENT DOCUMENTS 3,463,032 8/1969 Murrphy ................................ 74/495
3,712,151 1/1973 Diehl ..................................... 74/527
4,034,178 7/1977 Koppenheffer et al. ............. 74/527

Primary Examiner—Patrick D. Lawson
Attorney, Agent, or Firm—Sughrue, Mion, Zinn, Macpeak and Seas

[57] ABSTRACT

A click stop mechanism for an interchangeable lens. A first click stop ball is adapted to engage with any of a plurality of click grooves formed in an inner wall of an aperture preset ring corresponding to both manual aperture preset marks and an automatic aperture preset mark. A switch button protrudes through a stationary ring in which the first click ball is fitted and the switch pin is slidably disposed in the hollow switch button with a coil spring therebetween. A second click ball is disposed so as to engage in either of two click grooves formed on opposite sides of the base portion of the switch button corresponding to the minimum manual aperture preset mark and the automatic aperture preset mark.

4 Claims, 6 Drawing Figures

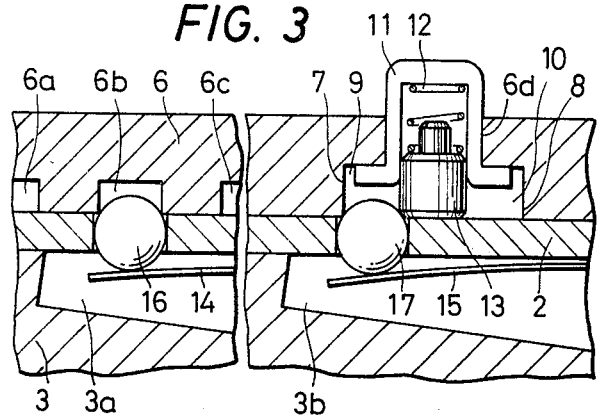
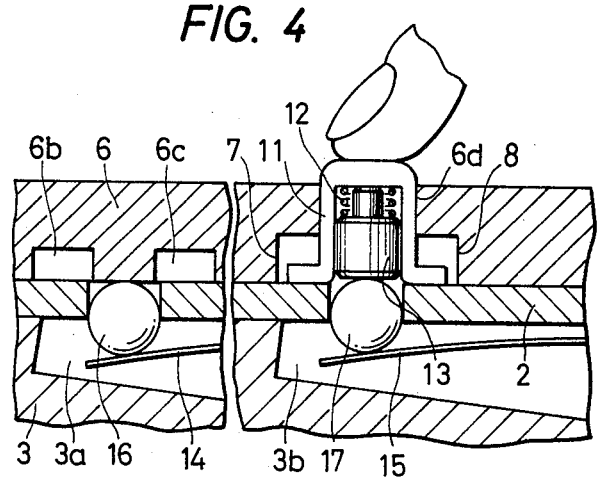
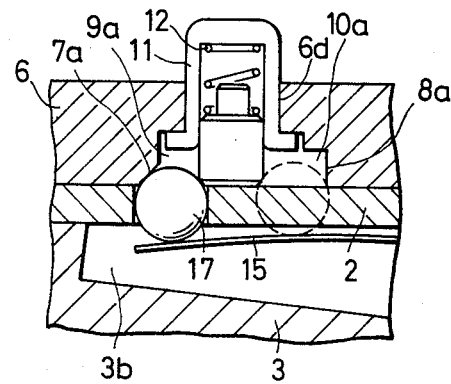

CLICK STOP DEVICE

BACKGROUND OF THE INVENTION

The present invention relates to a click stop mechanism provided in the aperture preset ring of an interchangeable lens.

A click stop mechanism has been employed for an interchangeable lens in which a click ball urged by a spring is engaged with rectangular or V-shaped grooves in the aperture preset ring to stop the ring with a click (hereinafter expressed as "a click-stop" when applicable). A photographing operation is carried out by turning the aperture preset ring to a desired aperture value (manual aperture value) in a manual aperture preset range according to the photographic intent and available lighting. In the case of a lens used in a shutter speed priority automatic exposure system, that is, in the case of a so-called "EE lens", in addition to the above-described manual aperture value positions an automatic aperture preset position "A" or "EE" ("A" position) is provided and a click stop groove is provided therefor. For selecting a manual aperture value, the aperture diameter of the lens is set by turning the aperture preset ring. For the "A" position, it is set by the automatic exposure control mechanism in the camera body. Although the two click stop grooves are provided in the same aperture preset ring, they have completely different functions.

In order to clearly distinguish the operation of switching the manual aperture value position over to the "A" position from the operation of switching the "A" position over to the manual aperture value position, heretofore the click grooves were made deeper or additional click grooves were provided for the manual aperture value position and the "A" position to thereby increase the click-stop. Using this technique, switching can be clearly detected due to the increased click-stop load. However, there is a drawback in that the operation of turning or switching, the aperture preset ring requires a relatively large force.

In addition, a technique is known in the art according to which means for stopping switching over from the manual aperture value position to the "A" position and vice versa is provided wherein switching is permitted only by operating one of two separate release means. However, thus technique is also disadvantageous in the following point: If, because of the structure of a camera, dimensional requirements such as an angle required for the switching operation are not sufficiently satisfied, the components of the stopping means will have an insufficient strength. If a strong force is inadvertently exerted on the aperture preset ring when the interchangeable lens is engaged with or disengaged from the camera body, the components of the stopping means may be damaged.

Accordingly, an object of the invention is to provide a click stop device for an aperture preset ring which, in switching over the manual aperture value position to the "A" position and vice versa, will not be damaged, even if a large force is applied thereto when the lens is engaged with or disengaged from the camera body, and in which a click stop load for detecting the switching operation is reduced.

SUMMARY OF THE INVENTION

In accordance with these and other object of the invention, there is provided a click stop device for an interchangeable lens including an aperture preset ring, a stationary ring and a mount ring with the preset ring being rotatably provided on an outer wall of the stationary ring and with the stationary ring being integral with the mount ring. Click grooves are formed in an inner wall of the aperture preset ring with the click grooves corresponding to manual aperture preset marks and an automatic aperture preset mark provided on an outer wall of the aperture preset ring. A first click ball is biased by a first click spring towards the outer wall of the stationary ring with the first click ball being disposed in a hole in the stationary ring. The first click ball engages with any one of the click grooves to click stop the aperture preset ring. A hollow switch button is provided extending through a hole in the aperture preset ring with a head of the switch button protruding outwardly from the aperture preset ring. A switch pin is slidably disposed in an interior portion of the hollow switch button. A coil spring is disposed between the switch pin and switch button to urge the switch button against an inner surface of the aperture preset ring while the switch pin is urged against an outer surface of the stationary ring. Two click grooves corresponding to a minimum manual aperture preset mark and the automatic aperture preset mark are formed in the side walls of cuts formed on opposite sides of a base portion of the switch button and side walls of the switch pin. A second click ball fitted in a hole in the stationary ring is urged by a second click spring so as to engage with either of the two click grooves formed on opposite sides of the base portion of the switch button. The two click grooves formed on opposite sides of the base portion of the switch button may have the same size and shape or the click grooves corresponding to the automatic aperture preset mark may be made deeper than the other of the two click grooves. The other of the two click grooves, which corresponds to the minimum manual aperture preset mark, may be formed with slanted wall surfaces on the outer wall thereof, that is, the wall opposite the switch pin.

BRIEF DESCRIPTION OF THE DRAWINGS

FIG. 3 is a partial sectional front view showing a state of the aperture preset ring which is preset at the minimum aperture value position;

FIG. 4 is a partial sectional front view showing the aperture preset ring which is turned while a switch button is being depressed; and FIG. 5 is a partial sectional front view showing another embodiment of a click stop device according to the invention in which the configuration of click grooves is modified.

DESCRIPTION OF THE PREFERRED EMBODIMENTS

The invention will be described with references to preferred embodiments thereof.

Figure 1A:
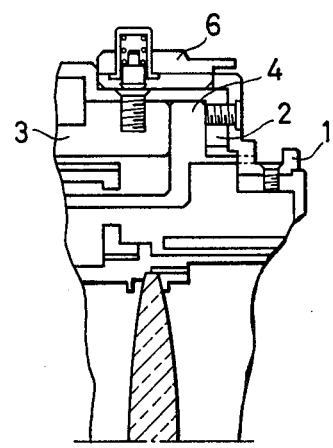
FIGS. 1A and 1B are sectional side views showing part of an interchangeable lens utilizing a preferred embodiment of a click stop device according to the invention.
Figure 1B:
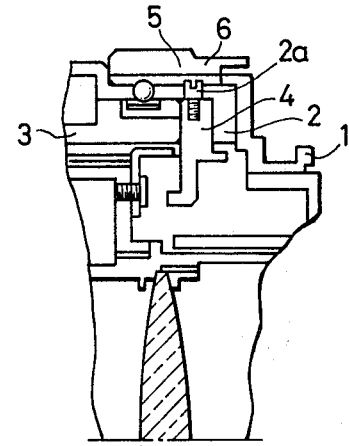
Figure 2:
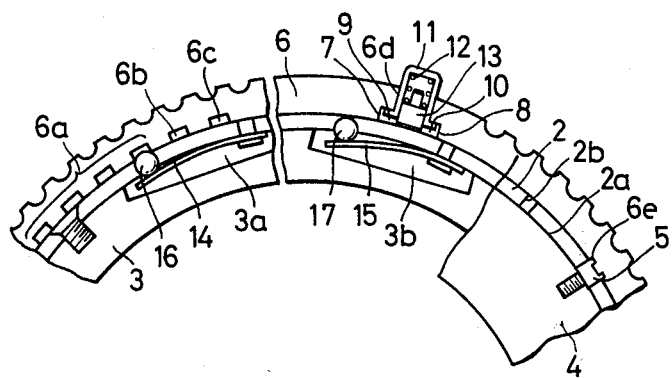
FIG. 2 is a partial sectional front view showing a state of an aperture preset ring which is click-stopped at a manual aperture value position.

As shown in FIGS. 1A, 1B and 2, a rotatable aperture preset ring 6 is provided on the outer wall of a stationary ring 2 integral with a mount ring 1, and an aperture rotation ring 4 which turns together with the aperture preset ring 6 is provided between the stationary ring 2 and a coupling ring 3 integral with the stationary ring 2. Manual aperture value marks such as "2.8", "4", "5.6" and "8" and the "A" mark (not shown) are marked off on the outer wall of the aperture preset ring 6. Click grooves 6a corresponding to the manual aperture values except for the minimum aperture value, a click groove 6b corresponding to the minimum aperture value and a click groove 6c corresponding to the "A" mark are provided in the inner wall of the aperture preset ring 6. A click ball is urged outwardly by a click spring 14 fixedly secured to the stationary ring 2 so that it engages with the selected one of the click grooves 6a, 6b and 6c to click-stop the aperture preset ring 6.

With reference to FIGS. 3 and 4, the aperture preset ring 6 has a hole 6d through which a switch button 11 protrudes outwardly. The button 11 has an inverted-U shape in section, as shown in FIG. 2. A coil spring 12 is provided between the button 11 and a switch pin 13 which is slidably inserted in the button 11 so that the switch button is depressed outwardly while the switch pin is depressed inwardly by the coil spring. Accordingly, the flange of the switch button 11, which is provided at the base of the switch button 11, is normally abutted against the upper surfaces of cuts 7 and 8 which are formed on both sides of the base of the switch button 11 so that a space, namely, a click groove 9 corresponding to the minimum manual aperture value mark, is provided between the side wall of the cut 7 and the side wall of the switch pin 13. Another space, namely, a click groove 10 corresponding to the "A" mark, is provided between the side wall of the cut 8 and the side wall of the switch pin 13. A click ball 17 is urged outwardly by a click spring 15 fixedly secured to the stationary ring 2 so that is is engaged with the click grooves 9 and 10 to click-stop the aperture preset ring 6.

The coupling ring 3 is provided with relief grooves 3a and 3b in which click springs 14 and 15 are freely movable. An aperture rotation screw 5 (FIG. 2) is fixedly secured to the aperture rotation ring 4. The screw 5 extends through an elongated groove 2a formed in the stationary ring 2 and is engaged with a groove 6e in the aperture preset ring 6. The length of the elongated groove 2a corresponds to the maximum rotational angle of the aperture preset ring 6. Rotation of the aperture preset ring 6 is stopped when the screw abuts against the end 2b of the elongated groove 2a.

When the click ball 16 is engaged with any one of the click grooves 6a by turning the aperture preset ring 6 counterclockwise as viewed in FIG. 2, the aperture preset ring 6 is click-stopped. In this condition, the click ball 17 is merely in contact with the inner wall of the aperture preset ring 6 and the ring 6 is not click-stopped by the click ball 17.

If the aperture preset ring 6 is turned counterclockwise against the click-stop load of the click groove 6a until it reaches the minimum manual aperture value position, then as shown in FIG. 3 the click ball 16 is engaged with the click groove 6b while the click ball 17 is engaged with the click groove 9 so that the aperture preset ring 6 is click-stopped.

If it is attempted to further turn the aperture preset ring 6 counterclockwise to the "A" position, a click stop load due to the click groove 9 is added to the click stop load due to the click groove 6b. That is, the load of rotating the aperture preset ring 6 is increased. Thus, the manual aperture value positions and the "A" position can be clearly distinguished from each other.

When the aperture preset ring 6 is turned to the "A" position while the switch button 11 is depressed as shown in FIG. 4, the click ball 17 is depressed inwardly by the switch button 11 and the switch pin 13. In the state, the aperture preset ring 6 can be turned without being affected by the click stop load due to the click groove 9; that is, the torque required for turning the ring 6 is the same as that required for turning it to the manual aperture value position.

If, as shown in FIG. 5, a click groove 10a corresponding to the "A" position which is formed by the switch pin 11 and the cut 8a is made deeper than the click groove 10 in FIG. 3 so that the click ball 17 engages therewith more deeply, when the aperture preset ring 6 is moved from the "A" position to the minimum aperture value position, i.e., when the ring 6 is turned clockwise, the click stop load is increased. Thus, switching the aperture preset ring 6 from the "A" position to the minimum aperture value position can be more clearly detected. Further, if in the click groove 9a corresponding to the minimum aperture value position a cut 7a is formed which slants with respect to the cut 7 shown in FIG. 3, when the aperture preset ring 6 is turned from the minimum aperture value position to the higher aperture value position, the load is reduced. As may be readily appreciated, the click stop load can be adjusted by changing the configuration of the click grooves 9a and 10a which are formed by the switch button 11 and the cuts 7a and 8a.

In accordance with the invention, as described above, the aperture preset ring is click-stopped by one of the click stop mechanisms in the manual aperture value range, while in switching the aperture preset ring from the minimum aperture value position to the "A" position and vice versa, the other click stop mechanism is used additionally to increase the click stop load so that the switching operation can be clearly detected. When the aperture preset ring is turned while the switch button is being depressed, the added click stop load is decreased so that the aperture preset ring can be turned by the same torque as that in the case of turning the aperture preset ring in the manual aperture value range. Furthermore, the click stop load can be adjusted by changing the configurations of the click grooves which are formed by the switch button and the cuts.

If an interchangeable lens is erroneously or inadvertently engaged with or disengaged from the camera body, the aperture preset ring may be turned by a strong force. However, even in such an undesirable case, the switch pin is smoothly moved over the click ball and the aperture rotation screw is abutted against the stationary ring which has a sufficiently high strength to limit the rotation of the aperture preset ring. Thus, no excessively great force acts on the click stop device and accordingly the latter will not be damaged.

The click stop device of the invention is made up the switch button, the switch pin, the coil spring, and the hole and the cuts which are provided in the aperture preset ring. The number of components forming the device is very small. The click balls and the click springs may be conventional ones. Thus, the device can be manufactured at a very low cost. The components are small in size, requiring only a small space. Thus, the device can be provided even in a small interchangeable lens satisfactorily. Thus, the click stop device of the invention is advantageous in that it can be applied not only to an aperture preset ring but also to a zooming ring adapted to switch a macro zoom lens from the zooming range to the macro range and vice versa.

What is claimed is:

1. A click stop device for an interchangeable lens comprising: an aperture preset ring, a stationary ring and a mount ring, said preset ring being rotatably provided on an outer wall of said stationary ring and said stationary ring being integral with said mount ring, click grooves being formed in an inner wall of said aperture preset ring, said click grooves corresponding to manual aperture preset marks and an automatic aperture preset mark provided on an outer wall of said aperture prest ring; a first click spring and a first click ball biased by said first click spring toward said outer wall of said stationary ring, said first click ball engaging with an one of said click grooves to click stop said aperture preset ring; a hollow switch button provided for said aperture preset ring, a head of said switch button protruding outwardly from said aperture preset ring through a hole in said aperture preset ring, a switch pin slidably disposed in said hollow switch button; a coil spring interposed between said switch pin and said switch button in such a manner that elastic force of said spring depresses said switch button against an inner surface of said aperture preset ring and said switch pin against an outer surface of said stationary ring, two click grooves corresponding to a minimum manual aperture preset mark and said automatic aperture preset mark being formed between side walls of cuts formed on opposite sides of a base portion of said switch button and side walls of said switch pin; and a second click spring and a second click ball, said second click ball being biased by said second click spring through a hole in said stationary ring at a position so as to engage with either of said two click grooves formed on opposite sides of base portion of said switch button.

2. The click stop device of claim 1 wherein said two click grooves formed on opposite sides of said base portion of said switch button have substantially the same size and shape.

3. The click stop device of claim 1 wherein a one of said two click grooves formed on opposite sides of said base portion of said switch button corresponding to said automatic aperture preset mark is deeper than the other of said two click grooves.

4. The click stop device of claim 3 wherein said other one of said two click grooves is formed with a slanting outer wall.

* * * * *